(12) United States Patent
Andrus et al.

(10) Patent No.: US 8,458,301 B1
(45) Date of Patent: Jun. 4, 2013

(54) AUTOMATED CONFIGURATION OF NETWORK DEVICES ADMINISTERED BY POLICY ENFORCEMENT

(75) Inventors: Frank D. Andrus, Sanbornton, NH (US); Howard J. Roemer, Jr., Bow, NH (US); Eric P. Dupont, Nashua, NH (US)

(73) Assignee: Bradford Networks, Inc., Concord, NH (US)

( * ) Notice: Subject to any disclaimer, the term of this patent is extended or adjusted under 35 U.S.C. 154(b) by 232 days.

(21) Appl. No.: 12/915,577

(22) Filed: Oct. 29, 2010

Related U.S. Application Data

(60) Provisional application No. 61/256,607, filed on Oct. 30, 2009.

(51) Int. Cl.
*G06F 15/177* (2006.01)
(52) U.S. Cl.
USPC .......................................... 709/220; 709/223

(58) Field of Classification Search
USPC ................. 709/203, 217, 220, 221, 222, 223, 709/224
See application file for complete search history.

(56) References Cited

U.S. PATENT DOCUMENTS

| | | | |
|---|---|---|---|
| 6,393,386 B1 * | 5/2002 | Zager et al. | 703/25 |
| 2006/0259604 A1 * | 11/2006 | Kotchavi et al. | 709/223 |

* cited by examiner

*Primary Examiner* — Barbara Burgess
(74) *Attorney, Agent, or Firm* — Maine Cernota & Rardin

(57) ABSTRACT

A system and method for dynamic device configuration enabling network and security administrators to define policies that indicate event and alert conditions within their networks. The policies incorporate information about network devices, endpoints connected to those devices, input from external security systems, local endpoint policy compliance, and date/time-of-day to determine whether to generate an event or alert. Events and alerts can be associated with actions that effect changes to network device configurations in order to maintain a desired operational state of the network.

18 Claims, 17 Drawing Sheets

SYSTEM PROCESSES

SYSTEM PROCESSES

ADMINISTRATOR SYSTEM CONFIGURATION PROCESS

NETWORK DISCOVERY AND GROUP INITIALIZATION

ACTION MANAGEMENT

ROLE MANAGEMENT

DEVICE PROFILER

EXTERNAL NOTIFICATION

CORRELATION ENGINE PORT / CLIENT ACTION EXCECUTION PROCESS

ACTION SELECTION

AUTOMATED CONFIGURATION OF NETWORK DEVICES ADMINISTERED BY POLICY ENFORCEMENT

RELATED APPLICATIONS

This application claims the benefit of U.S. Provisional Applications No. 61/256,607, filed Oct. 30, 2009, and is herein incorporated in its entirety by reference.

FIELD OF THE INVENTION

The invention relates to network device configuration, in particular, automated dynamic configuration of network devices based on the enforcement of administrator defined policies.

BACKGROUND OF THE INVENTION

Today's network devices are very powerful and rich in features. Prior to the deployment of devices in their networks, administrators must configure them to provide the functionality and levels of security they need to operate effectively. As circumstances and conditions in their networks change, administrators are required to make periodic adjustments to these configurations to ensure their continued efficacy. Network monitoring of conditions can exist within external sources, including packet monitoring systems, intrusion detection systems, intrusion protection systems, antivirus/antispyware monitoring systems, Cisco NetFlow/sFlow® analyzers, and others. sFlow® is a registered trademark of the InMon Corporation. These external systems can generate alerts when violations to their individual policies occur.

For convenience, the following glossary provides acronym definitions of terms to be used: AD—Active Directory; ANS—Adaptive Network Security; AS—Anti-Spyware; AV—Anti-Virus; CLI—Command Line Interface; DHCP—Dynamic Host Control Protocol; DLP—Data Loss Prevention; DNS—Domain Name System; DPI—Deep Packet Inspection; Endpoint—Any device that connects to the network that is not considered part of the network infrastructure; HTTP—HyperText Transport Protocol; IDS—Intrusion Detection System; IP—Internet Protocol; IPS—Intrusion Protection System; LAN—Local Area Network; NAC—Network Access Control; NBAD—Network Behavior Anomaly Detection; NID—Network Infrastructure Device; NMS—Network Management Systems; PC—Personal Computer; PDA—Personal Digital Assistant; RADIUS—Remote Access Dialup Service; SIEM—Security Information and Event Management; SNMP—Simple Network Management Protocol; SOAP—Simple Object Access Protocol; SSH—Secure Shell; TELNET—Teletype Network; VPN—Virtual Private Network; WAN—Wide Area Network; WWW—World Wide Web; XML—Extensible Markup Language; and MIB—Management Information Base.

Generally speaking, network devices can allow for their configuration by supporting protocols such as HyperText Transfer Protocol (HTTP), Teletype Network (TELNET), Secure Shell (SSH), Simple Object Access Protocol (SOAP), Simple Network Management Protocol (SNMP), and others that are sometimes proprietary to a specific vendor. HTTP supports World Wide Web (WWW) interfaces comprised of web pages that are accessed through industry standard web browsers such as Microsoft® Internet Explorer® or Mozilla® Firefox®. Microsoft® and Internet Explorer® are registered trademarks of the Microsoft Corporation, and Mozilla® and Firefox® are registered trademarks of the Mozilla Foundation Corporation. TELNET and SSH allow administrators to access a command line interface (CLI) language that defines a set of commands used to read from and write to the device. SOAP is a protocol specification for exchanging structured information in the implementation of Web Services in computer networks. It is used to provide programmatic access to device functions and data. SNMP is used in network management systems to monitor network-attached devices for conditions that warrant administrative attention.

Devices that are found on a network fall into many categories based upon the functions they offer. Major functions include network access, monitoring, security, storage, services, and endpoint usage. Network access devices, such as switches, routers, wireless access points, VPN gateways, etc. comprise the basic network. Each of these device types will be referred to as a Network Infrastructure Device (NID). Devices that allow network monitoring, such as Network Management Systems (NMS), provide visibility into how the various NIDs and applications found on a network are operating, and collect and report on historical data gathered for those devices and applications. Devices that provide security functions can allow or prevent network access to individuals based on numerous factors including identity, health status, network usage characteristics, time-of-day, etc. Some control the point of access while others monitor the network for suspicious activity on an ongoing basis. Storage systems provide storage services to other systems and users of the network. Services is a broad category that encompasses a wide variety of devices and applications such as DNS, DHCP, email, RADIUS and more. Many devices cross boundaries and offer functions that fit into two or more of the above categories. Lastly, endpoint usage refers to all devices on the network that do not fit into one of the other categories. These include basic network users accessing the network with laptops, desktops, PDAs, IP phones, gaming consoles, specialized industrial or heath equipment, etc.

With existing technologies, administrators have only limited ability to automate actions based on a diverse set of inputs. They may have a Network Management System (NMS) deployed in order to provide visibility into their network and provide a vehicle for simplified device configuration. They may have security surveillance products deployed to alert them if undesirable behavior occurs in the network. They may have individual vendor specific tools that enable them to automate some basic tasks based on inputs received from specific devices. They may have endpoint technologies deployed to monitor compliance. However, as IT budgets continue to shrink, it is increasingly difficult to maintain an adequately sized and trained staff to perform the continuous monitoring and control required by these diverse systems.

What is needed is a system and method to provide robust automation of these monitoring and control functions to protect the integrity of the network; freeing administrators from ongoing and repetitious tasks, enabling them to focus on more challenging issues requiring their creativity.

SUMMARY OF THE INVENTION

The current invention provides for the automation of configuration actions applied to network infrastructure devices as the result of various forms of network stimulus. Embodiments enable administrators to create configuration actions and define the circumstances under which those actions are executed.

Dynamic device configuration functions allow network and security administrators to define policies that indicate event and alert conditions within their networks. The policies incorporate diverse information about network devices, endpoints connected to those devices, input from external security systems, local endpoint policy compliance results, and date/time-of-day to determine whether to generate an event or alert or directly trigger an action. Events and alerts can also be associated with actions that affect changes to network device configurations in order to maintain a desired operational state of the network. Policies specify constraints on who and what is allowed on the network and provide alerts when policy violations occur. Alerts can also indicate conditions where change to a network device configuration becomes desirable in order to maintain network security or integrity.

Benefits include improved: simplicity, reliability, price, installation ease & time, breadth of supported endpoints, breadth of supported security infrastructure components, breadth of supported network infrastructure, scalability, performance, flexibility, third party integration.

Embodiments provide a system for automated network device configuration by policy enforcement comprising: a configuration module for initialization and configuration of a network; a discovery module for discovery initialization of network infrastructure devices (NIDs) on the network; an action module for action management of NIDs on the network; a role module for role management characterizing the NIDs, interfaces, users, and endpoints on the network; a profiling module for device profiling, identifying types of the endpoints connected to the NIDs on the network; an external policy module for external policy notification whereby systems external to the network are configured to inform the system with events and alerts; and a compliance module for compliance of endpoints on the network by agent security policy; whereby the system controls connections between the endpoint devices and users with network infrastructure and information technology (IT) resources of the network.

Another embodiment provides a correlation engine comprising: gathering connection time, endpoint status, identity of user logged into the endpoint, identity of endpoint owner and point of access NID or port role; if the NID is configured for interface-based actions, most secure status representing all endpoints connected to the interface is computed, and if status or role has action defined, and endpoint NID has same action applied, no action is taken; if the NID is configured for the interface-based actions, the most secure status representing all the endpoints connected to the interface is computed, and if the status or role has action defined, and the endpoint NID does not have same action applied, and if the endpoint NID does not have previous action applied, set action is executed and undo action parameters are saved; if the NID is configured for the interface-based actions, the most secure status representing all the endpoints connected to the interface is computed, and if the status or role has action defined, and the endpoint NID does not have same action applied, and if the endpoint NID does have previous action applied, undo action is executed using saved parameters, and set action is executed and undo action parameters are saved; if the NID is configured for the interface-based actions, the most secure status representing all endpoints connected to the interface is computed, and if neither the status nor role has action defined, and the endpoint NID does not have previous action applied, no action is taken; if the NID is configured for the interface-based actions, the most secure status representing all the endpoints connected to the interface is computed, and if neither the status nor role has action defined, and the endpoint NID does have previous action applied, undo action is executed using saved parameters; if the NID is configured for client-based actions, use individual endpoint status and if status or role has action defined, and endpoint NID has same action applied, no action is taken; if the NID is configured for the client-based actions, the individual endpoint status is used and if the status or role has action defined, and the endpoint NID does not have same action applied, and if the endpoint NID does not have previous action applied, set action is executed and undo action parameters are saved; if the NID is configured for the client-based actions, the individual endpoint status is used and if the status or role has action defined, and the endpoint NID does not have same action applied, and if the endpoint NID does have previous action applied, undo action is executed using saved parameters, and set action is executed and undo action parameters are saved; if the NID is configured for the client-based actions, use the individual endpoint status and if neither the status nor the role has action defined, and the endpoint NID does not have previous action applied, no action is taken; and if the NID is configured for the client-based actions, use the individual endpoint status and if neither the status nor the role has action defined, and the endpoint NID does have previous action applied, undo action is executed using saved parameters.

In yet another embodiment, configuration comprises: discovering network infrastructure devices (NID) by administrator; defining actions to perform on the discovered NIDs; defining roles to assign to endpoints connect to the discovered NIDs; defining endpoint profiles; configuring external security systems to provide notification when events/alerts occur; and defining endpoint security policies, wherein, when completely configured, defined actions are automatically performed for defined conditions.

For an embodiment discovery comprises: identifying types of discovered NIDs; creating model representations for the discovered NIDs; querying the discovered NIDs to learn of interfaces each the discovered NID supports; creating model representations for the interfaces; and creating groups.

In a subsequent embodiment, action management comprises: creating actions for NID model types; and assigning actions to specific NID model instances for status transition states and roles.

Another embodiment provides that the role management comprises: creating roles characterizing users and endpoints; and associating the roles with actions for a group of NID or interface models.

For yet another embodiment, device profiling comprises: creating device profiling rules; connection of an endpoint to at least one the NID; collecting endpoint profile data from the at least one NID; identifying endpoint type from the profiles; creating models for the endpoints; setting status of the model; and assigning a role for the model.

In an embodiment, external policy notification comprises: configuring external systems to generate events and alerts directed to the system; identifying endpoint associated with the event or alert; setting status of the endpoint according to rules created by administrator.

A further embodiment provides that the endpoint compliance by agent security policy comprises: defining security policies identifying required and prohibited software; attempting to communicate with an agent on the endpoint; downloading an agent if none present; running the agent; obtaining information about the endpoint; selecting appropriate security policy; sending the appropriate security policy to the agent; executing the appropriate security policy by the agent on the endpoint; responding with results of execution of the appropriate security policy; determining status of the endpoint from the results; and setting status of endpoint model for the endpoint.

Embodiments provide a method for automated dynamic network device configuration by policy enforcement comprising the steps of: configuring initialization of a network; initializing discovery of network infrastructure devices (NIDs) on the network; managing action of the NIDs on the network; managing roles characterizing devices, users, and endpoints on the network; profiling devices identifying types of endpoints connected to the NIDs on the network; external policy notification whereby systems external to the network are configured with policy notification from events and alerts; and compliance of endpoints on the network by agent security policy; whereby endpoint devices and users are connected with network infrastructure and information technology (IT) resources of the network.

In a subsequent embodiment, a correlation engine comprises: gathering connection time, endpoint status, identity of user logged into the endpoint, identity of endpoint owner and point of access NID or port role; if the NID is configured for interface-based actions, most secure status representing all endpoints connected to the interface is computed, and if status or role has action defined, and endpoint NID has same action applied, no action is taken; if the NID is configured for the interface-based actions, the most secure status representing all the endpoints connected to the interface is computed, and if the status or role has action defined, and the endpoint NID does not have same action applied, and if the endpoint NID does not have previous action applied, set action is executed and undo action parameters are saved; if the NID is configured for the interface-based actions, the most secure status representing all the endpoints connected to the interface is computed, and if the status or role has action defined, and the endpoint NID does not have same action applied, and if the endpoint NID does have previous action applied, undo action is executed using saved parameters, and set action is executed and undo action parameters are saved; if the NID is configured for the interface-based actions, the most secure status representing all endpoints connected to the interface is computed, and if neither the status nor role has action defined, and the endpoint NID does not have previous action applied, no action is taken; if the NID is configured for the interface-based actions, the most secure status representing all the endpoints connected to the interface is computed, and if neither the status nor role has action defined, and the endpoint NID does have previous action applied, undo action is executed using saved parameters; if the NID is configured for client-based actions, use individual endpoint status and if status or role has action defined, and endpoint NID has same action applied, no action is taken; if the NID is configured for the client-based actions, the individual endpoint status is used and if the status or role has action defined, and the endpoint NID does not have same action applied, and if the endpoint NID does not have previous action applied, set action is executed and undo action parameters are saved; if the NID is configured for the client-based actions, the individual endpoint status is used and if the status or role has action defined, and the endpoint NID does not have same action applied, and if the endpoint NID does have previous action applied, undo action is executed using saved parameters, and set action is executed and undo action parameters are saved; if the NID is configured for the client-based actions, use the individual endpoint status and if neither the status nor the role has action defined, and the endpoint NID does not have previous action applied, no action is taken; and if the NID is configured for the client-based actions, use the individual endpoint status and if neither the status nor the role has action defined, and the endpoint NID does have previous action applied, undo action is executed using saved parameters.

Following embodiments include the initialization configuration comprising: discovering network infrastructure devices (NID) by administrator; defining actions to perform on the discovered NIDs; defining roles to assign to endpoints connect to the discovered NIDs; defining endpoint profiles; configuring external security systems to provide notification when events/alerts occur; and defining endpoint security policies, wherein, when completely configured, defined actions are automatically performed for defined conditions.

For an embodiment, discovery initialization comprises: identifying types of the discovered NIDs; creating model representations for the discovered NIDs; querying the discovered NIDs to learn of interfaces each the discovered NID supports; creating model representations for the interfaces; and creating groups.

Another embodiment provides that action management comprises: creating actions for NID model types; and assigning actions to specific NID model instances for status transition states and roles.

For yet another embodiment, role management comprises: creating roles characterizing users and endpoints; and associating the roles with actions for a group of NID or interface models.

In another embodiment, device profiling comprises: creating device profiling rules; connection of an endpoint to at least one the NID; collecting endpoint profile data from the at least one NID; identifying endpoint type from the profiles; creating models for the endpoints; setting status of the model; and assigning a role for the model.

In yet another embodiment, external policy notification comprises: configuring external systems to generate events and alerts directed to the system; identifying endpoint associated with the event or alert; setting status of the endpoint according to rules created by administrator.

Additional embodiments provide the compliance of endpoints by agent security policy comprises: defining security policies identifying required and prohibited software; attempting to communicate with an agent on the endpoint; downloading an agent if none present; running the agent; obtaining information about the endpoint; selecting appropriate security policy; sending the appropriate security policy to the agent; executing the appropriate security policy by the agent on the endpoint; responding with results of execution of the appropriate security policy; determining status of the endpoint from the results; and setting status of endpoint model for the endpoint.

In additional embodiments, endpoint devices comprise PCs, laptops, handheld devices, IP phones, game consoles, security cameras, HVAC systems, and hospital systems; and the network infrastructure and IT resources comprise wireless LAN, wired LAN, WAN, VPN, internet, e-mail, databases, and DHCP/DNS.

Embodiments provide an apparatus for automated computer network device configuration by policy enforcement comprising: a microprocessor operating on instructions of a configuration module for initialization configuration of the computer network; a discovery module for discovery initialization of network infrastructure devices (NIDs) on the computer network through at least one physical communication connection; an action module executed by a microprocessor for action management of access devices on the computer network; a role module for role management characterizing devices, users, and endpoints on the computer network; a profiling module for device profiling identifying types of the endpoints connected to the NIDs on the computer network through at least one physical communication connection; an external policy module for external policy notification whereby computer system components located external to the devices of the computer network are configured with policy notification from events and alerts; and a compliance module for compliance of the endpoints on the computer network by agent security policy; whereby the apparatus controls connectivity of the endpoint devices and users with the computer network infrastructure devices and information technology (IT) resources of the computer network.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present device, system and method integrates with equipment from many existing network access vendors.

Figure 1:
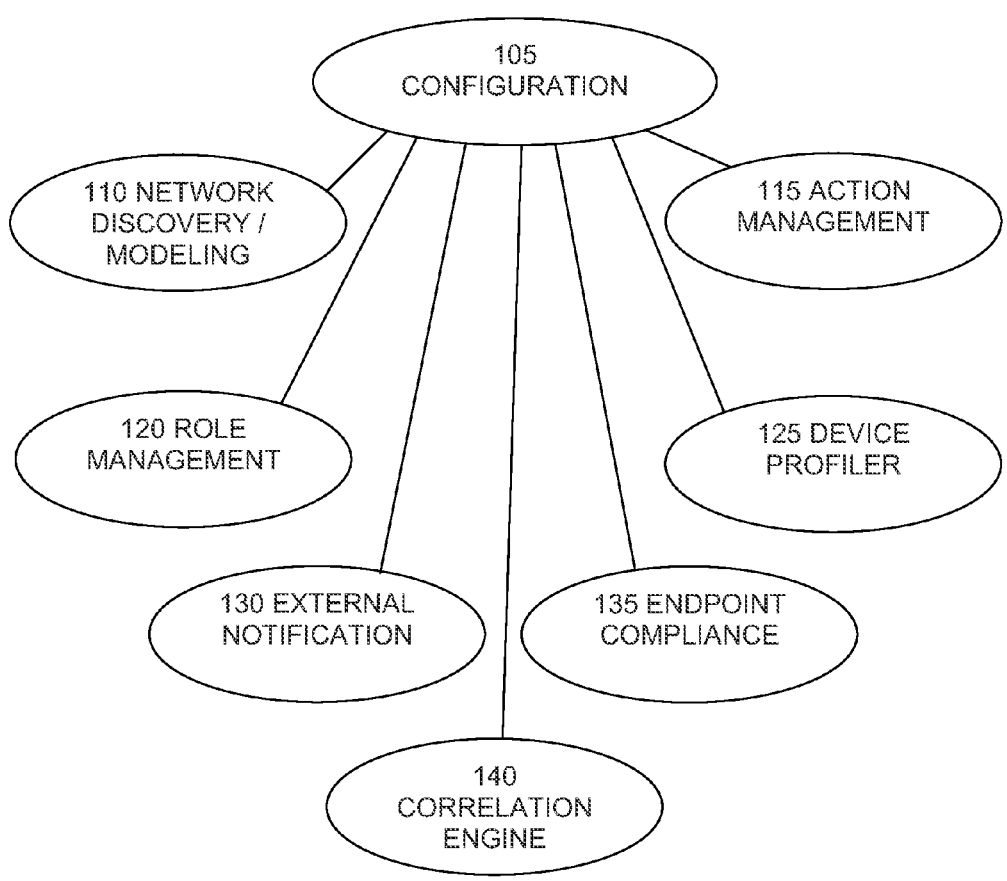
FIG. 1 is an overview of system processes configured in accordance with one embodiment of the present invention.

FIG. 1 depicts an overview of system processes 100. They comprise configuration 105; network discovery/modeling 110; Action Management 115; Role Management 120; Device Profiling 125; External Notification 130; Endpoint Compliance 135; and Correlation Engine operations 140.

Figure 2:
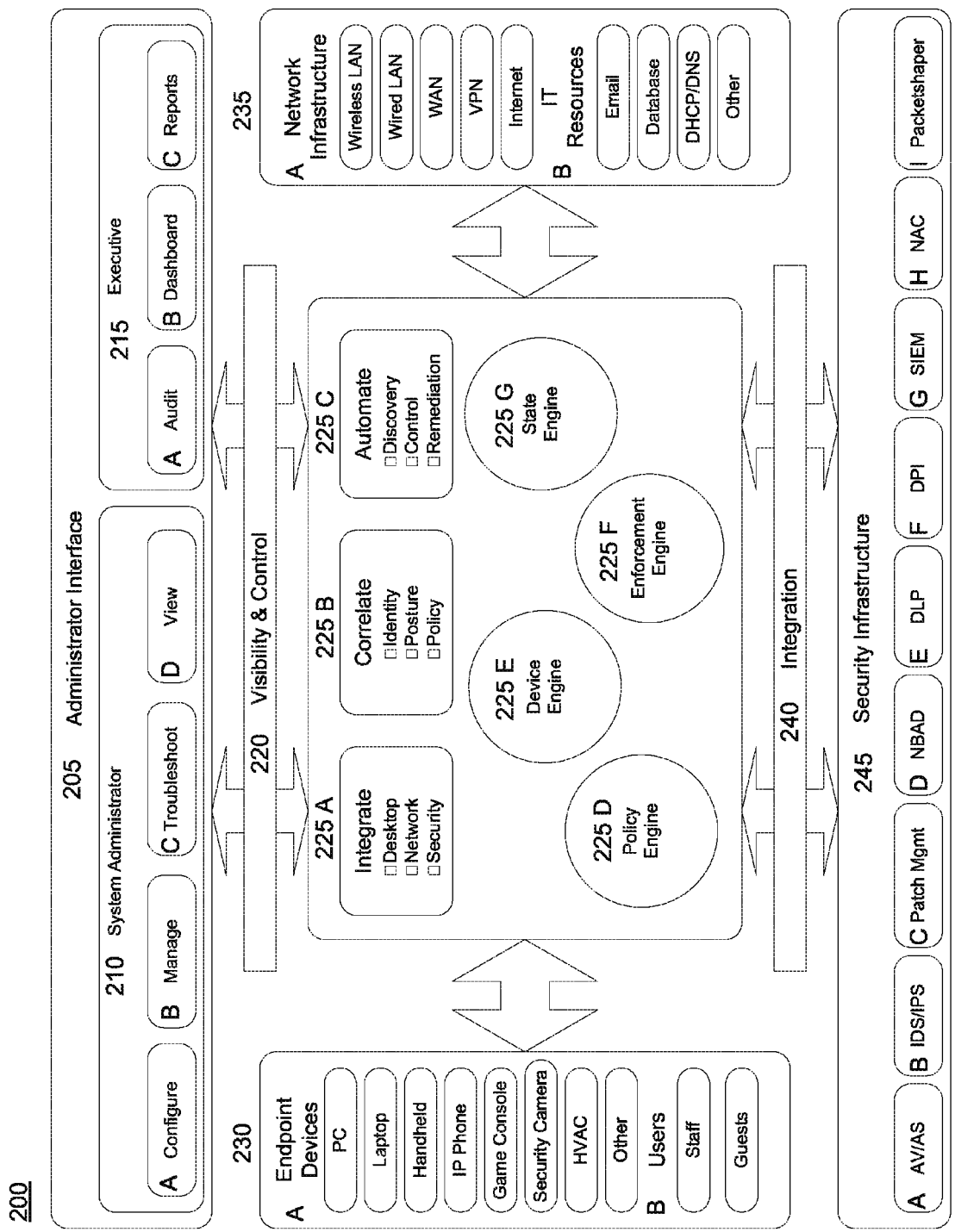
FIG. 2 is a top level block diagram illustrating an adaptive security platform configured in accordance with one embodiment of the present invention.

FIG. 2 is a top level block diagram illustrating an Adaptive Network Security (ANS) platform configured in accordance with one embodiment of the present invention. It illustrates a system that integrates with a wide variety of network infrastructure and security equipment to provide visibility and control. It provides a comprehensive administrator interface allowing for configuring and customizing its features for optimal use in every type of network environment. It has the ability to identify, monitor and control any type of network endpoint that can connect to a network. It uses this real-time collection of network data to provide for the automation of device configuration tasks as determined by a network or security administrator. Administrator Interface 205 components comprise System Administrator 210 and Executive 215. System Administrator comprises modules including Configure 210A, Manage 210B, Troubleshoot 210C, and View 210D. Executive 215 comprises modules including Audit 215A, Dashboard 215B, and Reports 215C. Administrator Interface 205 interacts through Visibility & Control 220. Visibility & Control 220 interacts with components Integrate 225A, Correlate 225B, Automate 225C, Policy Engine 225D, Device Engine 225E, Enforcement Engine 225F, and State Engine 225G. These components also interact with Endpoint devices 230A and Users 230B. Endpoint devices 230A comprises nonlimiting examples of PCs, laptops, handheld devices, IP phones, game consoles, security cameras, HVAC systems, hospital system, and other devices able to interact with machine interfaces. Users 230B comprise any individuals or categorization of same who are granted access to a network. Integrate 225A Correlate 225B Automate 225C Policy Engine 225D Device Engine 225E Enforcement Engine 225F and State Engine 225G also interact with components Network Infrastructure 235A and IT Resources 235B. Network Infrastructure 235A comprises nonlimiting examples of wireless LAN, wired LAN, WAN, VPN, and internet. IT Resources 235B comprises nonlimiting examples of e-mail, database, DHCP/DNS, and other IT Resources. Components 225 further interact with Integration 240 which interacts with Security Infrastructure 245. Security Infrastructure 245 comprises nonlimiting components AV/AS 245A, IDS/IPS 245B, patch management 245C, NBAD 245D, DLP 245E, DPI 245F, SIEM 245G, NAC 245H, and packetshaper 245I.

Figure 3:
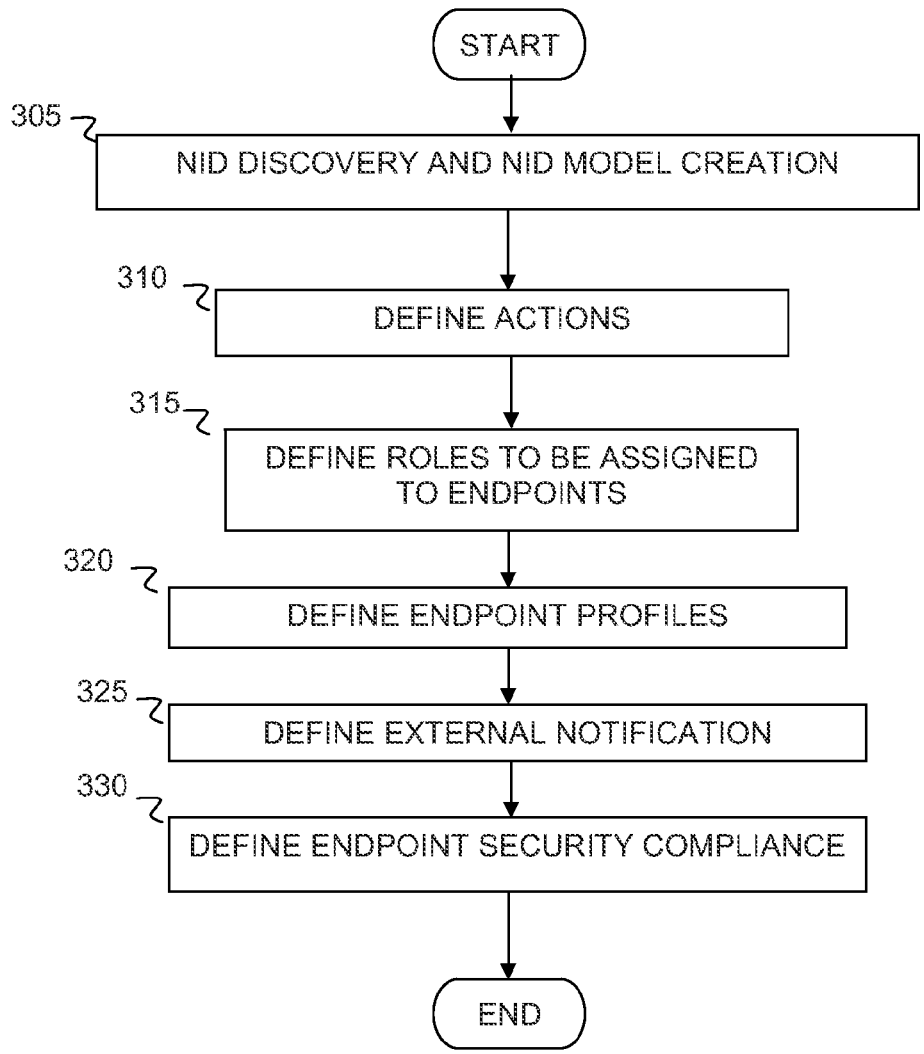
FIG. 3 is a simplified overview of a comprehensive system configuration process configured in accordance with one embodiment of the present invention.

FIG. 3 depicts an overview of an administrator configuration process 300. Administrators discover Network Infrastructure Devices (NID) in the network; NID representations are created using internal model representations within a database 305. They define actions to perform on any of the discovered NIDs 310. They define roles 315 to assign to endpoints and devices. They define endpoint profiles 320 that can automatically identify the endpoint types connected to NIDs. They configure external security systems to notify the invention when events/alerts occur on those systems 325. They define security policies that determine if endpoints are compliant with the desired parameters for them to be accepted onto the network 330. When completely configured, the invention automatically performs the defined actions for the defined conditions.

In embodiments, administrators perform the following steps: 1) Configure network infrastructure devices to notify the invention when endpoints connect and disconnect from the network; 2) Discover devices in their network, which creates models for them in the system database; 3) Optionally organize the devices into Groups; 4) Configure actions for those models according to what they want to accomplish in their network; 5) Optionally create role identifiers within the system; 5a) Optionally assign role identifiers with Groups of devices; 5b) Optionally assign role identifiers to users that are granted access to the network; 6a) Optionally create endpoint profiles that govern identification of endpoints found on the network; 6b) Optionally configure the invention to automatically identify and register certain types of endpoints and supply them with appropriate roles; 7) Optionally configure events and alerts that are received from external sources and systems, these can be used to affect the status of an endpoint; and 8) Optionally create one or more security policies to apply to endpoints that connect to the network. These policies can be configured to impact either all or only a subset of endpoints connecting to the network. In embodiments, policies define the analysis that will occur for each endpoint. Furthermore, for embodiments, the result of applying a security policy to an endpoint is to determine the endpoint's status. Model here refers to an abstract representation of any component on the network of which the system needs to be aware.

Figure 4:
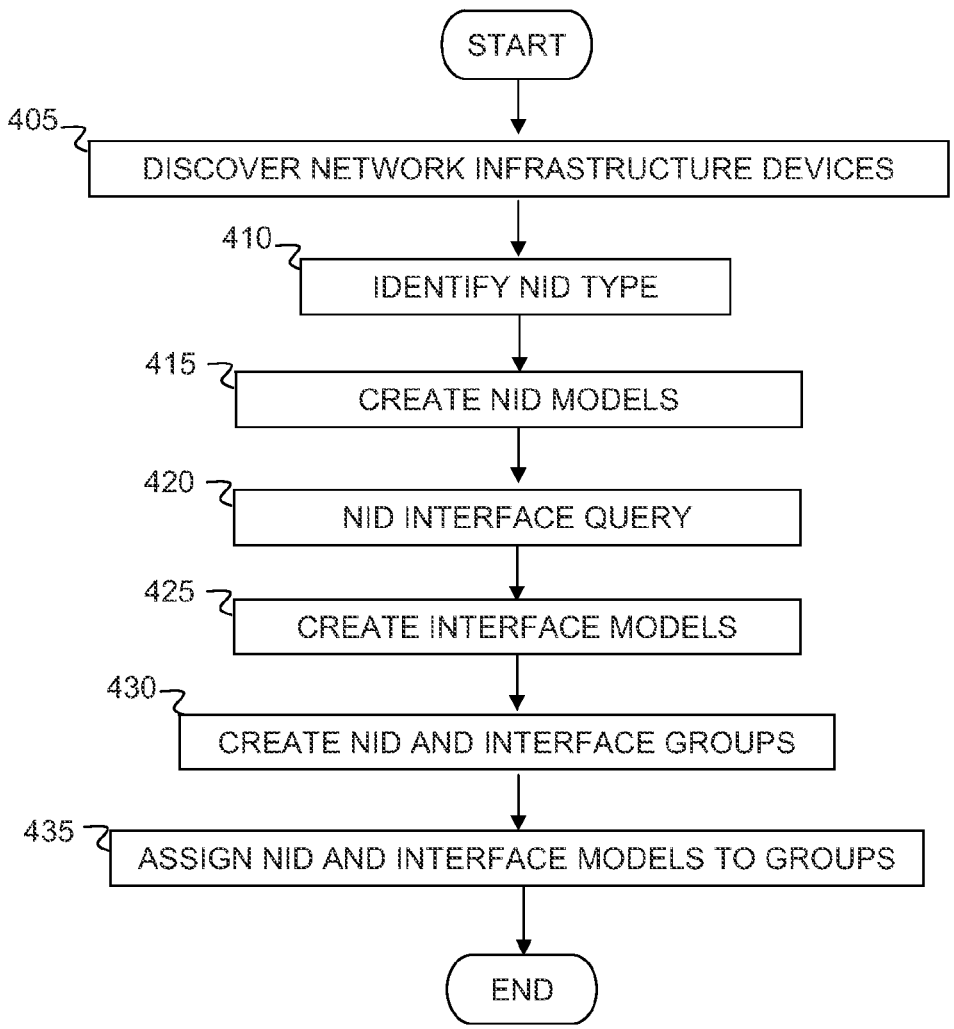
FIG. 4 is a simplified flow chart of a network discovery and Group initialization overview configured in accordance with one embodiment of the present invention.

FIG. 4 depicts a network discovery and Group initialization function 400 to learn what NIDs exist in a given network. As NIDs are discovered 405, their type is identified 410 and models are created 415 within the invention to represent each one. The NIDs are then queried further to learn of the interfaces each supports 420, and models are created for each interface as well 425. NIDs are also interrogated for other physical and logical components that represent some form of manageable entity. These components also become modeled within the system, influencing the endpoint management process. This provides the administrator with the ability to see what comprises their network for inventory purposes as well as providing a foundation for monitoring and controlling those network assets. These models can then be added to collections called Groups 430. NID models and their port models can individually be assigned to one or more Groups 435 based upon any desired criteria. In embodiments, one criterion for collecting NIDs in Groups includes combining devices from a similar vendor that offer similar command line support. For example, one group might include several network switches from a single vendor while another group might include only Wireless Access Points that exist in a particular building or geographical region.

Figure 5:
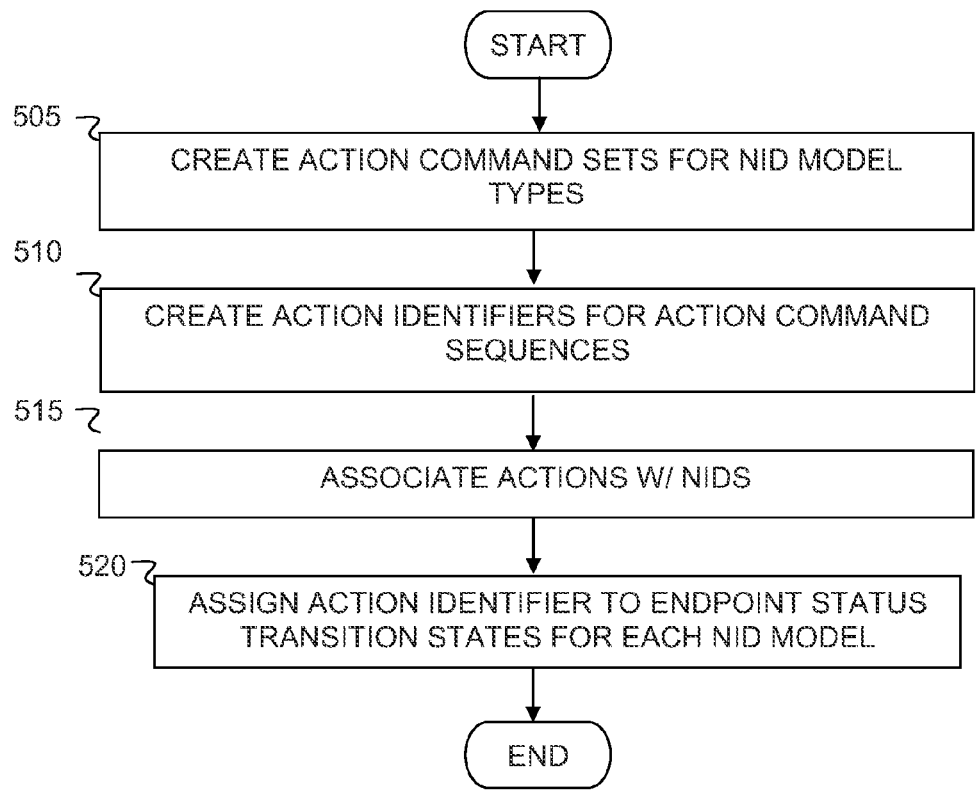
FIG. 5 is a simplified flow chart of action creation and management configured in accordance with one embodiment of the present invention.

FIG. 5 depicts how, for embodiments, administrators can create Actions 500. Actions consist of a set of one or more commands supported by a NID. Different vendors' devices support different command sets and protocols. Therefore, in embodiments, the commands an administrator enters to create an Action must correspond to a particular NID they choose to manipulate. If different NIDs exist in the network, as they often do, separate Actions can be created 505 and associated 510 with each corresponding NID. In embodiments, an Action is made up of two command sequences: one to be applied when an associated status condition is met (Set sequence) and another to be applied when that same status condition is no longer met (Unset sequence). Any number of Actions, identified by unique Action Names 515, can be created. Once created, Actions can be assigned to any NID model for each endpoint status 520, or they can be assigned to specific roles.

In embodiments, Actions comprise: a) a set of commands that correspond to a Command Line Interface supported by a device through TELNET or SSH; b) a set of Object IDs defined in an SNMP Management Information Base (MIB) supported by a device; c) a set of commands that correspond to an XML interface supported by a device; or d) a set of commands that correspond to a vendor proprietary interface supported by a device.

Figure 6:
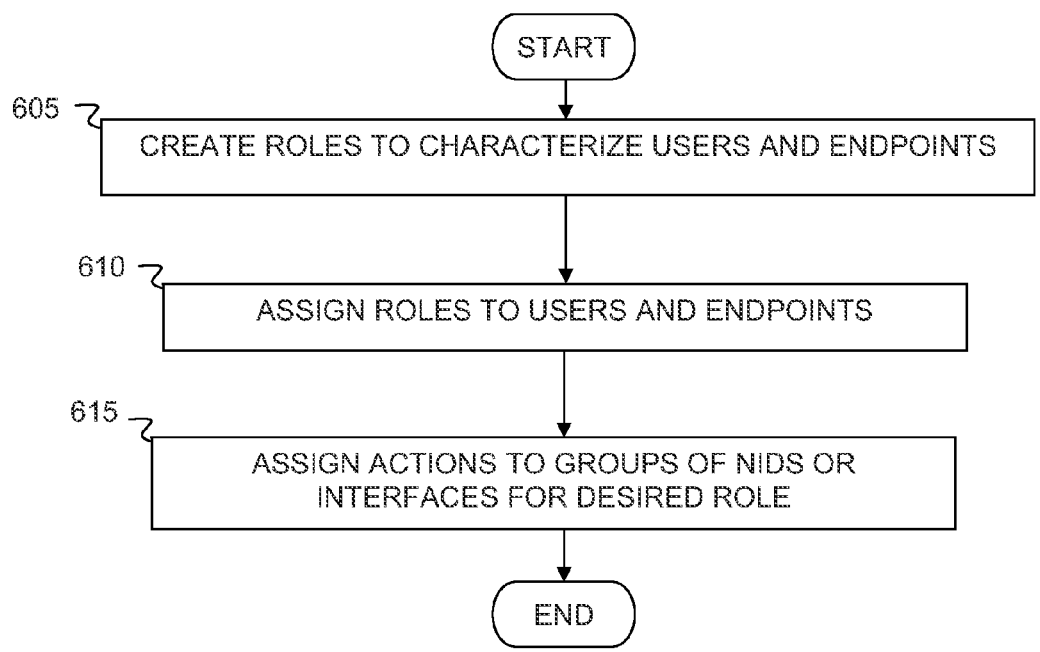
FIG. 6 is a simplified flow chart of a role management process configured in accordance with one embodiment of the present invention.

FIG. 6 depicts Role Management 600. Roles are created to characterize users, endpoints 605. Roles are "special identifiers" assigned by an administrator to models of users and endpoints monitored by the invention 610. For example, a collection of users might be assigned a role of "Student" to allow all Students to be controlled in a consistent way. Or all endpoints belonging to a particular department might be assigned a role of "Sales" to ensure they are granted appropriate network access for the Sales department. Roles are associated with Actions for a Group of NID or Interface models 615. When an endpoint modeled in the system (and having an assigned Role) connects to an interface or NID whose model is a member of a configured Group, these associations allow embodiments to locate an Action to apply to the NID for that endpoint. Actions associated with a role for a group of Interfaces are applied to the NID to which the affected Interface belongs. Roles can also be associated with individual user identity records. As with endpoints, user records are also modeled and stored in the system's database. This information can be provided directly by an administrator, or it can be imported from a directory service such as Microsoft Active Directory® (AD), Novell eDirectory, OpenLDAP, or others. Active Directory® is a registered trademark of the Microsoft Corporation. Embodiments are configured to require users to identify themselves when they connect to the network using an endpoint. If an administrator has configured the system in this way, endpoints may be assigned a status of "un-authenticated". For embodiments, if a user is required to log in, any Role assigned to the user takes precedence over the Role assigned to the endpoint to which the user is logging in.

Figure 7:
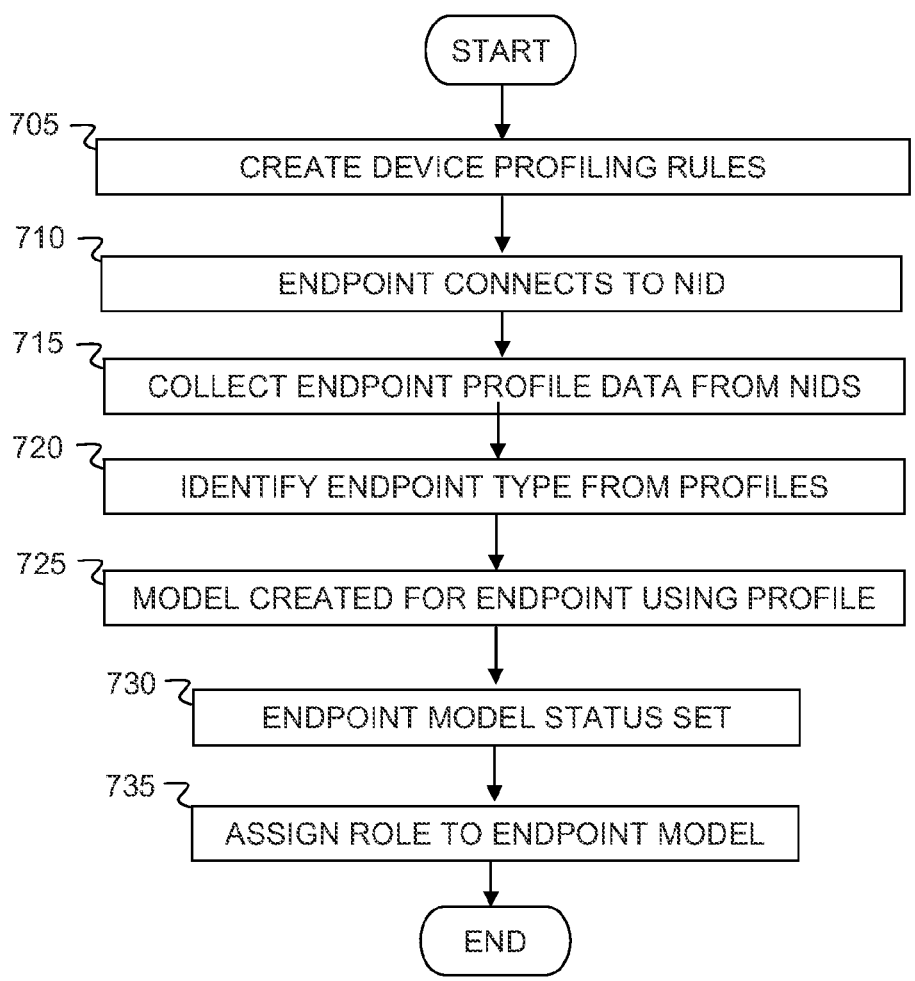
FIG. 7 is a simplified flow chart of a device profiler configured in accordance with one embodiment of the present invention.

FIG. 7 depicts a device profiler function 700 present in embodiments. With this capability, the invention identifies the type of many endpoints that are connected to NIDs on the network. Profiling is the act of identifying the type of an endpoint, such as a printer, IP phone, laptop PC, gaming console, etc. by using various techniques to examine the device in a non-invasive manner. Device profiling rules are created as part of the ANS configuration process 705. The profiling rules dictate to the ANS system how particular endpoints should be treated when their profile is identified. When an endpoint is connected to a NID 710, endpoint profile data is collected from various NIDs both immediately and on an ongoing basis 715, depending on the profiling techniques being used. The endpoint type is identified by comparing its profile against a library of known profiles 720. Once an endpoint type is known, a model for it can be automatically created within the system according to profiling rules defined by an administrator 725. The Model can also automatically have its status set 730 and have a role assigned 735. One example of how this feature might be used would be to configure the invention to automatically detect when certain Printers are added to the network. The invention can detect that the newly added endpoint is a Printer, can automatically register it to a department owner and give it a role of "Printer". This can then be used to determine an Action that can be applied to the NID.

Figure 8:
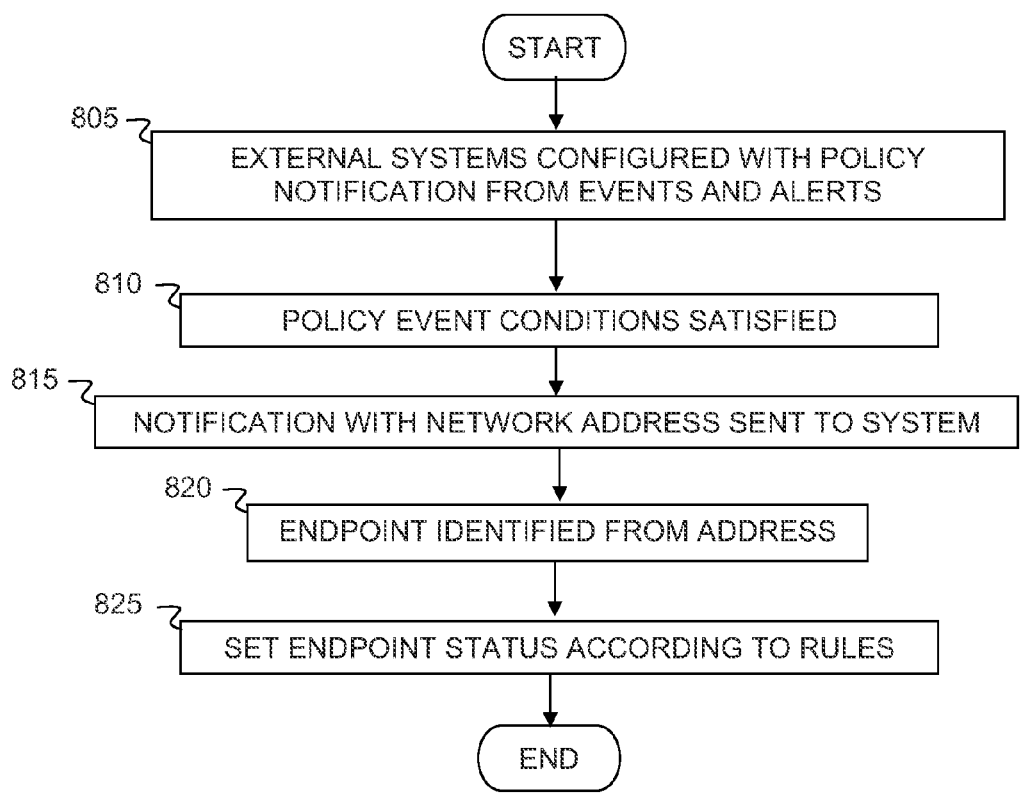
FIG. 8 is a simplified flow chart of an external notification process configured in accordance with one embodiment of the present invention.

FIG. 8 portrays configuration 800 to notify the invention of events and alerts. These events and alerts are generated by the external security and performance-related systems when their own policies are enforced. External security and performance related systems must first be configured to provide notifications to the invention 805. These notifications may take the form of SNMP traps, Syslog messages, or other proprietary forms. Policy event conditions are satisfied 810 when one of these external systems detects the conditions it has been configured to identify. An example of this would be an IDS system generating a Notification when it has detected suspicious network activity from a particular IP address. It sends this Notification with the offending IP address to the invention 815. The invention which uses the IP address to identify the specific endpoint 820 in its database. The endpoint status is then set according to rules created in the ANS system by the administrator 825.

Figure 9:
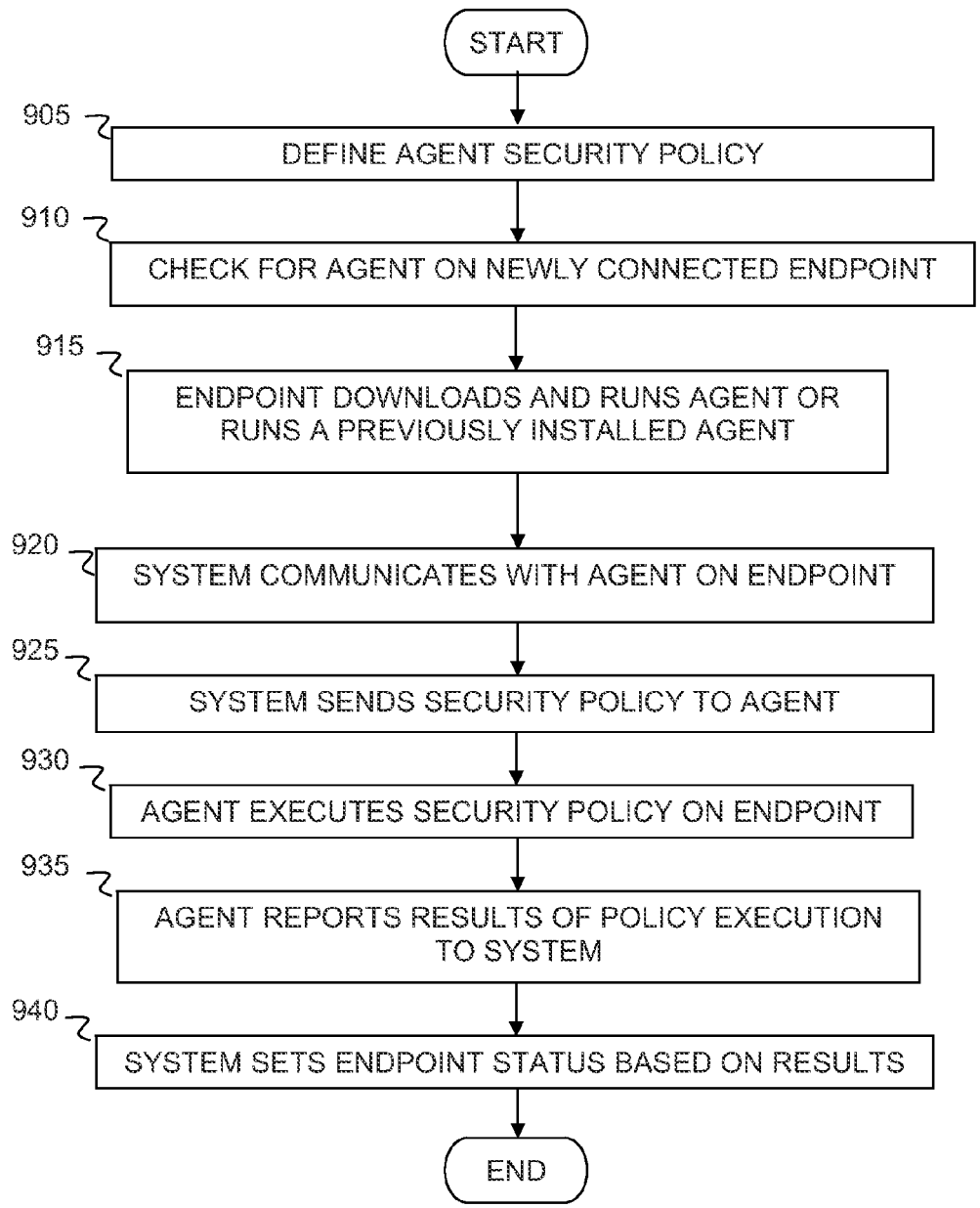
FIG. 9 is a simplified flow chart of an endpoint compliance process configured in accordance with one embodiment of the present invention.

FIG. 9 depicts an endpoint compliance process 900 that occurs on endpoints that connect to the network. Embodiments comprise an executable agent program that is run on an endpoint. This agent communicates with the main system to obtain a security policy and evaluates the endpoint to determine if the endpoint complies with that policy. Administrators define security policies 905 within the main system. These policies indicate software packages or versions of software packages an endpoint must have installed, or cannot have installed. They can also indicate what operating systems, versions, and patches are required, allowed or disallowed. Lastly, they can include actions that an agent can take on the endpoint if defined conditions are met. A few nonlimiting examples of these actions include renewing an IP address, displaying a message on the endpoint, updating the agent software, starting or stopping a process, or setting the endpoint status to restrict its network access. In embodiments, when an endpoint connects to the network, the invention attempts to communicate with an agent on the endpoint 910. If no agent is detected, the endpoint downloads and runs the agent 915. When the endpoint has an agent installed, it will respond with information about the endpoint, such as its physical and network addresses, its operating system, its system name and more 920. The invention will then use that information to send the appropriate security policy to the agent 925. The agent executes the security policy on the endpoint 930 and responds with the results 935. The invention uses the results to determine the status of the endpoint and sets the status on the endpoint model 940.

Figure 10:
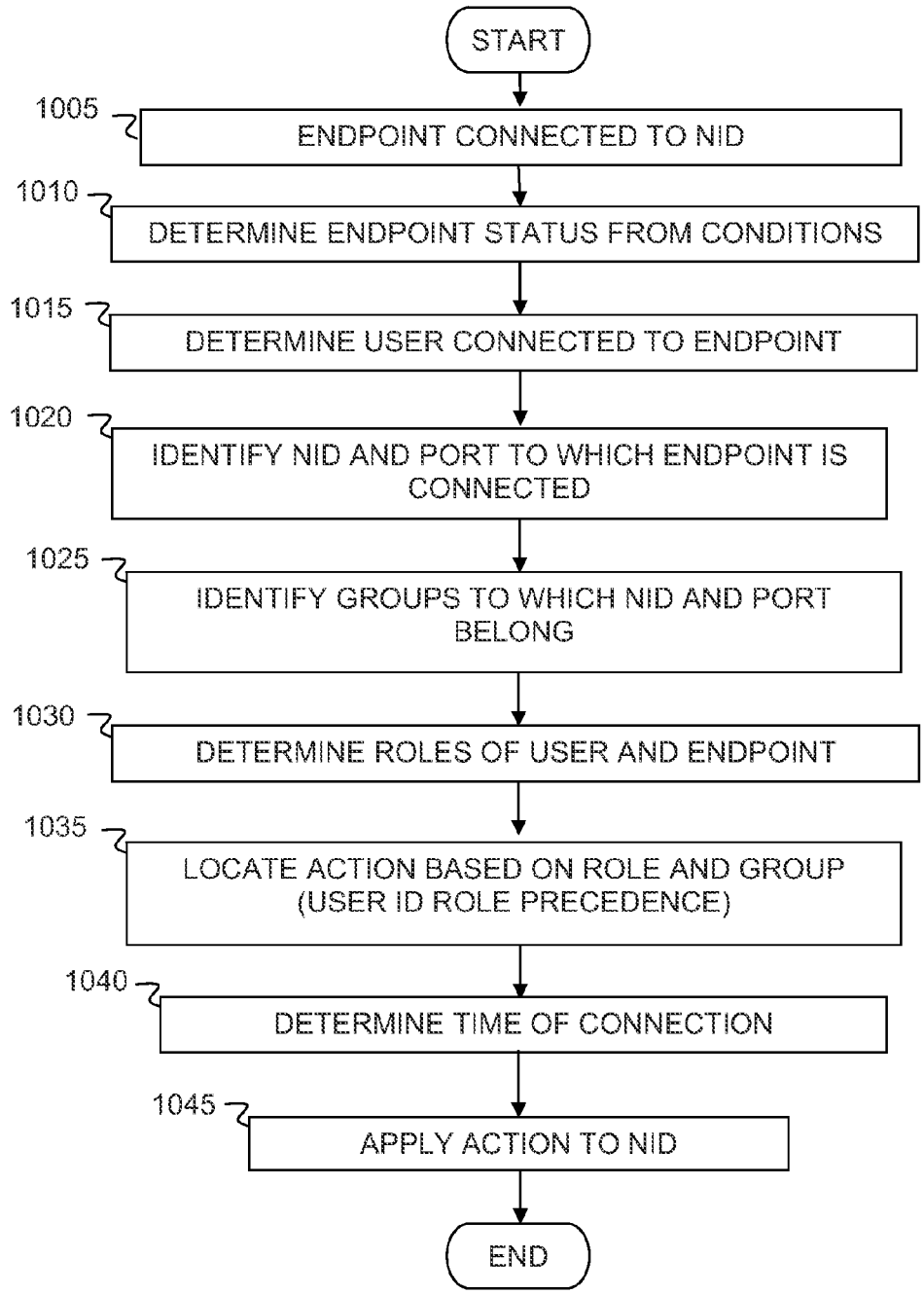
FIG. 10 is a simplified flow chart of a correlation engine configured in accordance with one embodiment of the present invention.
Figure 15:
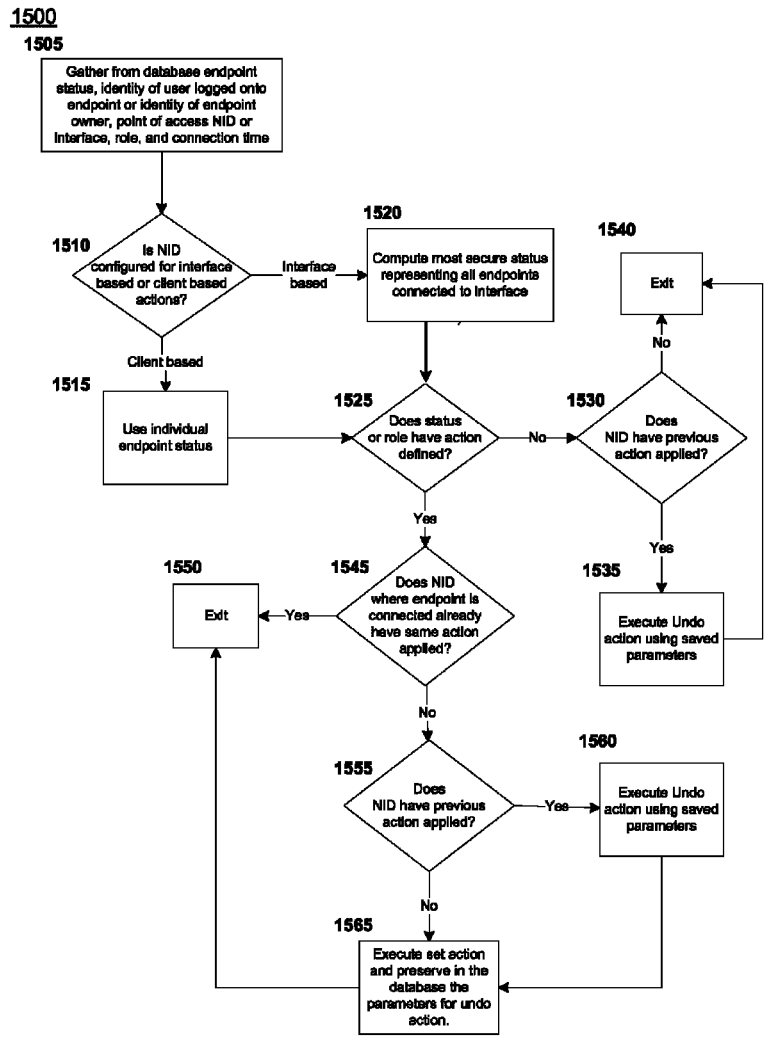
FIG. 15 is a simplified flow chart of the process used by the correlation engine to determine the interface/client based actions to apply to NIDs configured in accordance with one embodiment of the present invention.
Figure 16:
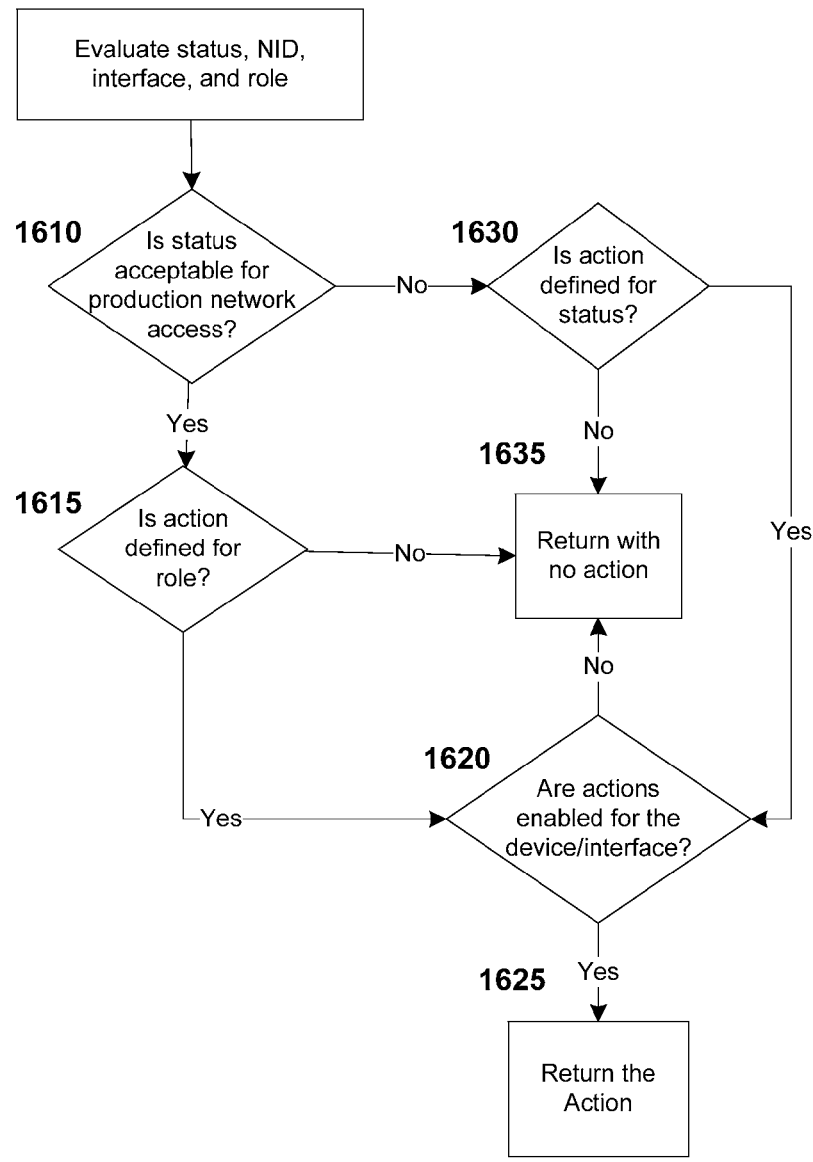
FIG. 16 is a simplified flow chart of action assignment configured in accordance with one embodiment of the present invention.

FIG. 10 depicts a Correlation Engine that is ultimately responsible for determining if an action should be executed on a NID 1000. The Correlation Engine encapsulates the logic used to determine what actions to apply and when to apply them. It uses several inputs to support this determination including: the status of an endpoint, endpoint identity or role, the location (NID, interface) or point of access where the endpoint connects to the network, the network connection state, and the current time. Related process steps are illustrated in FIGS. 15 and 16. The correlation engine is executed on a periodic basis and it is triggered by changes to any of the described inputs. Various embodiments of the invention are described with the following processes. Endpoint is connected to NID 1005; determine endpoint status from conditions 1010; determine the user connected to endpoint 1015; identify NID and port to which endpoint is connected; 1020; identify Groups to which NID and port belong 1025; determine Roles of user and endpoint 1030; locate Action based on Role and NID or Interface Group (user ID Role precedence) 1035; determine time of connection 1040; and apply Action to NID 1045. Embodiments maintain a status for each endpoint model in the database. The status is set based upon a variety of conditions, both internal and external. In addition to all the methods already mentioned in prior sections, endpoint status can also be changed based on schedules that can be configured within the invention, as a result of the execution of some task or policy, or simply through administrator manual intervention.

Process Flow Embodiment Examples

Figure 11:
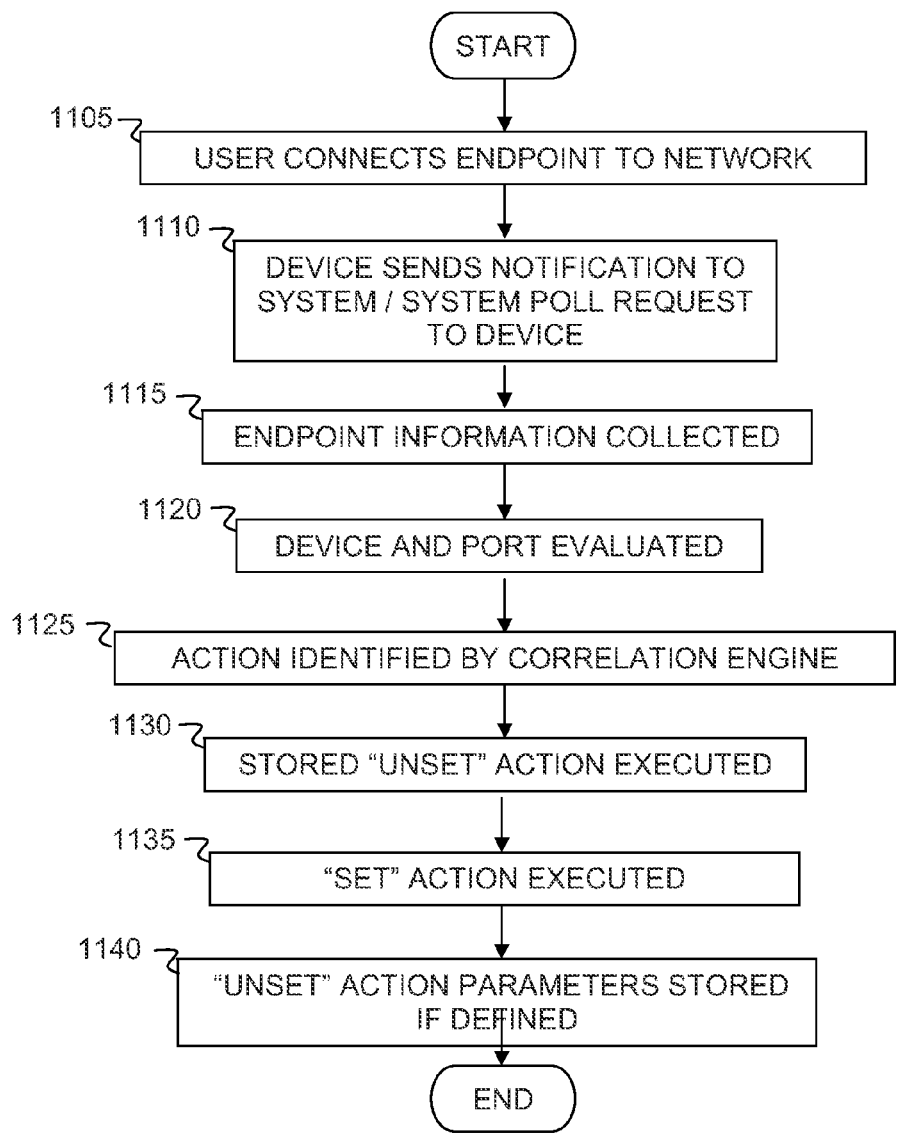
FIG. 11 is a simplified flow chart of a first process flow configured in accordance with one embodiment of the present invention.

FIG. 11 depicts a new notification example one process flow embodiment of the invention 1100. It is assumed for this example that the administrator has already performed the necessary initialization and configuration of both the NIDs and of the invention as shown in FIG. 3. A user connects an endpoint to the network using a wired connection 1105. The device sends a notification of the new connection to the system 1110. In embodiments, this notification takes the form of an SNMP trap, a Syslog message, a RADIUS request or some other, vendor proprietary, means. The system can also learn of a newly connected endpoint as the result of a poll request it makes to the device 1110. The system collects information about the endpoint from the device where it is connected, any other network device or external system that has data to contribute, as well as from the system's database 1115. This endpoint data can include, but is not limited to information about a user logged onto the endpoint, its physical address, its IP address, its operating system, its type, its current status, and the port/interface to which it is connected. If the endpoint is unknown, its status is set to 'unregistered'. If the endpoint is not 'unregistered', it must already have been registered and therefore has an owner. In addition to unregistered and registered, other status values an endpoint may be assigned include disabled, at-risk, and un-authenticated. If an endpoint is registered, its identity and role can be determined either by the owner who registered the endpoint, or, if authentication is being enforced, the user that is currently logged into the machine. The endpoint location (device and interface models) are evaluated 1120 to determine if they allow actions to be performed on endpoints to which they are connected. The endpoint characteristics are used by the Correlation Engine to identify an action to perform on the device in the network to which the endpoint is connected or a designated surrogate device 1125. If Actions are allowed for the affected device and interface models, the system is checked to determine if an Unset Action sequence has been preserved from a previous Set Action. If so, it is executed for the device 1130. The current Set Action is then executed for the device 1135. If an Unset Action sequence is configured for the current Set Action, the current system parameters used by the Action sequence are stored in the database to be executed when the next endpoint Set Action event occurs. 1140 FIGS. 15 and 16 provide related steps.

Figure 12:
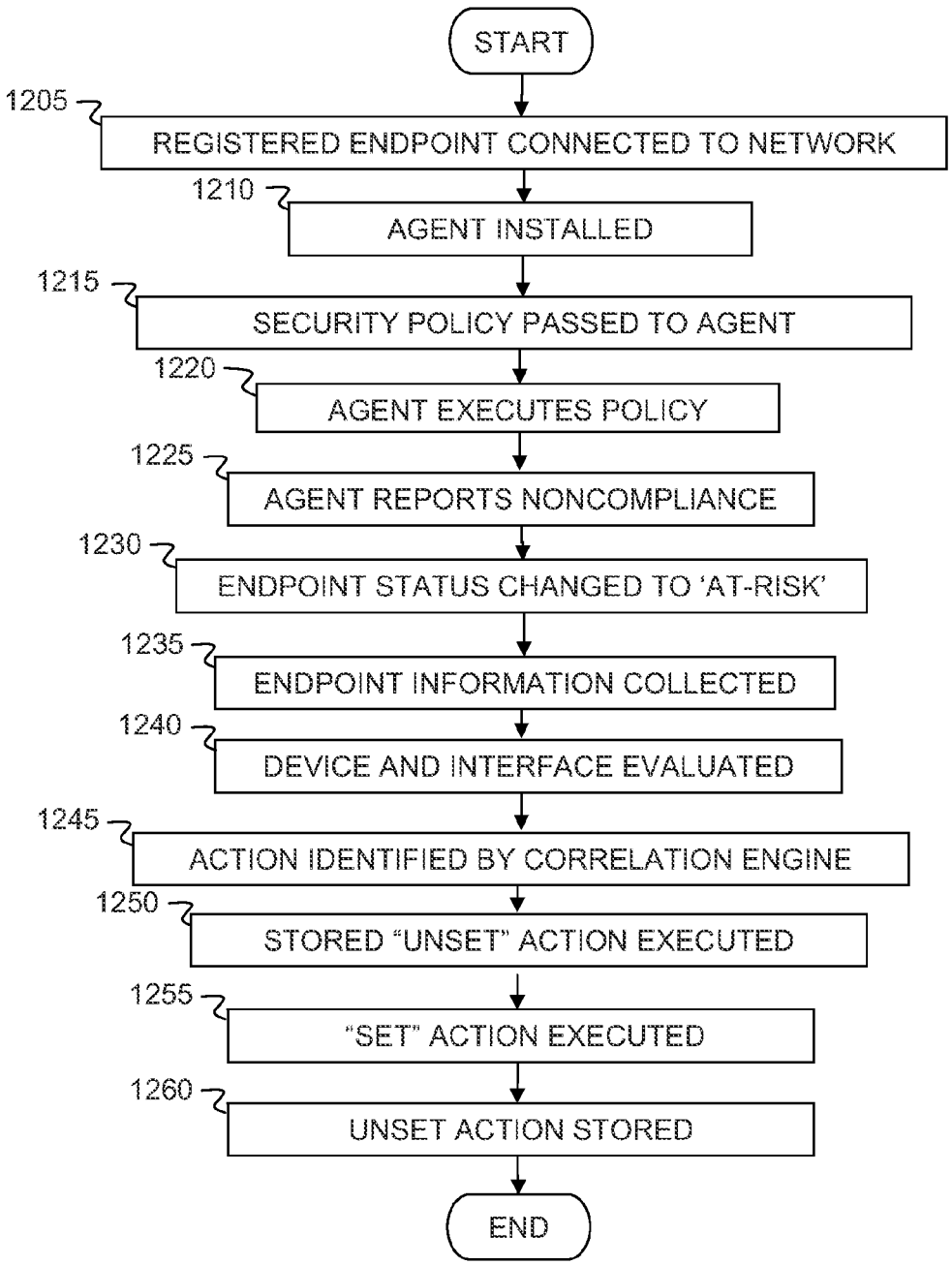
FIG. 12 is a simplified flow chart of a second process flow configured in accordance with one embodiment of the present invention.

FIG. 12 depicts a noncompliance example two process flow embodiment of the invention 1200. It is assumed for this example that the administrator has already performed the necessary initialization and configuration of both the NIDs and of the invention as shown in FIG. 3. An endpoint is connected to a network, is registered in the invention 1205, and has an agent installed 1210. This enables periodic scanning of the endpoint for adherence to a security policy that was configured by an administrator for that endpoint. The invention communicates with the agent on the endpoint to pass the security policy information to it 1215 and instructs the agent to execute the policy 1220. The agent reports back to the invention that the endpoint is not in compliance with the policy just evaluated 1225. The invention changes the status of the endpoint to at-risk 1230. The endpoint status along with its connection state, identity or role, location of where it is connected, and the current time are collected 1235. The device and interface are evaluated to determine if they allow actions to be performed on endpoints connected to them 1240. These characteristics are used by the correlation engine in the invention to identify an action to perform on the device in the network to which the endpoint is connected or a designated surrogate device 1245. If actions are allowed on the affected device and interface, and if any "Unset" Action has been stored for the device or interface, it is executed 1250. The "Set" action is then executed for the device 1255. If an unset action sequence is configured for the current action, the current system parameters used by the action sequence are stored in the database to be executed when the next endpoint action event occurs 1260.

Figure 13:
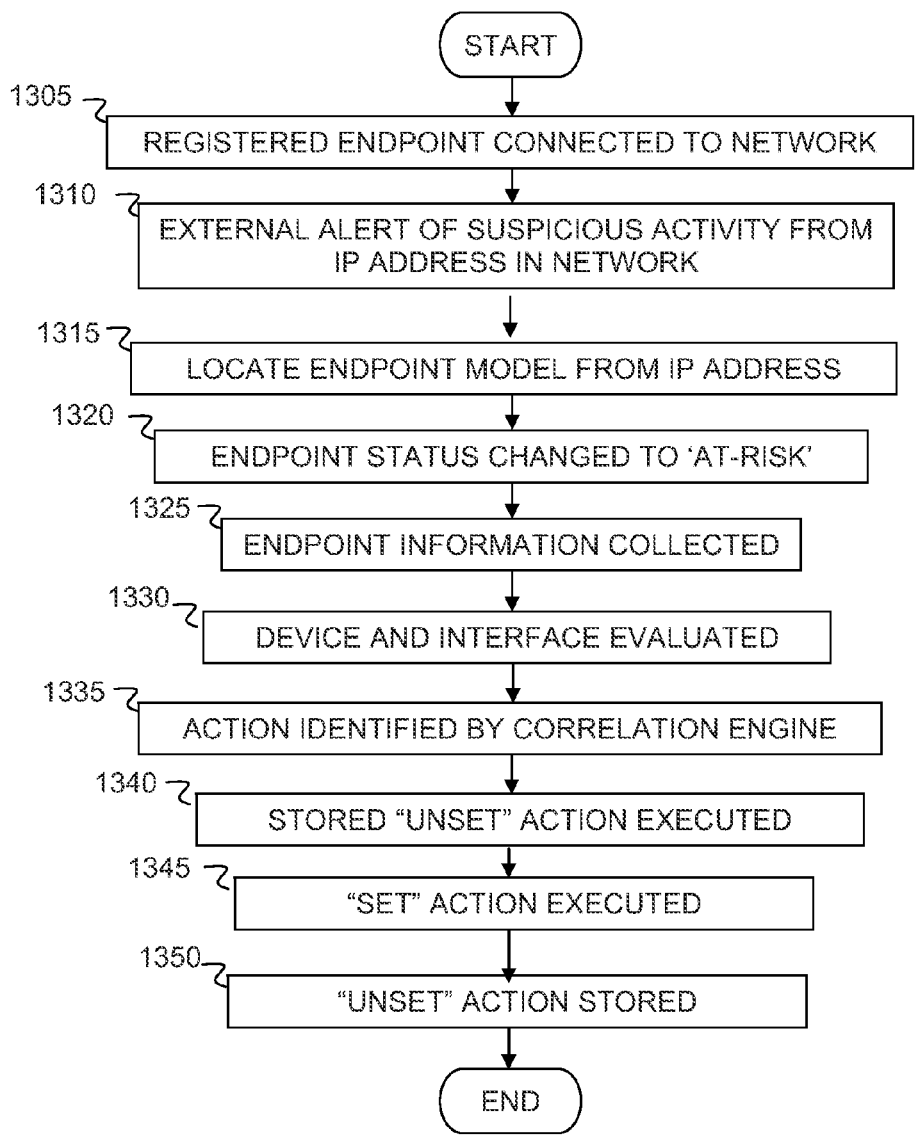
FIG. 13 is a simplified flow chart of a third process flow configured in accordance with one embodiment of the present invention.

FIG. 13 depicts an alert example three process flow embodiment of the invention 1300. It is assumed for this example that the administrator has already performed the necessary initialization and configuration of both the NIDs and of the invention as shown in FIG. 3. An endpoint is connected to a network and is registered in the invention 1305. An alert is received by the invention from an external IDS/IPS system that has identified an IP address in the network of generating suspicious network activity 1310. The invention uses the IP address contained in the alert to locate the model for the endpoint that is currently assigned that IP address 1315. It changes the status of the endpoint to at-risk 1320. The endpoint status along with its connection state, identity or role, connection location, and the current time are collected 1325. The endpoint location (device and port) are evaluated to determine if they allow actions to be performed on endpoints connected to them 1330. The endpoint characteristics are used by the Correlation Engine to identify an Action to perform. If any "Unset" Action has been stored for the device or interface, it is executed 1340. The "Set" Action is performed on the device in the network to which the endpoint is connected, or a designated surrogate device and if Actions are allowed on the affected device and interface, the Action is executed for the device 1345. If an Unset Action sequence is configured for the current action, the current system parameters used by the Action sequence are stored in the database to be executed when the next endpoint Action event occurs. 1350.

Figure 14:
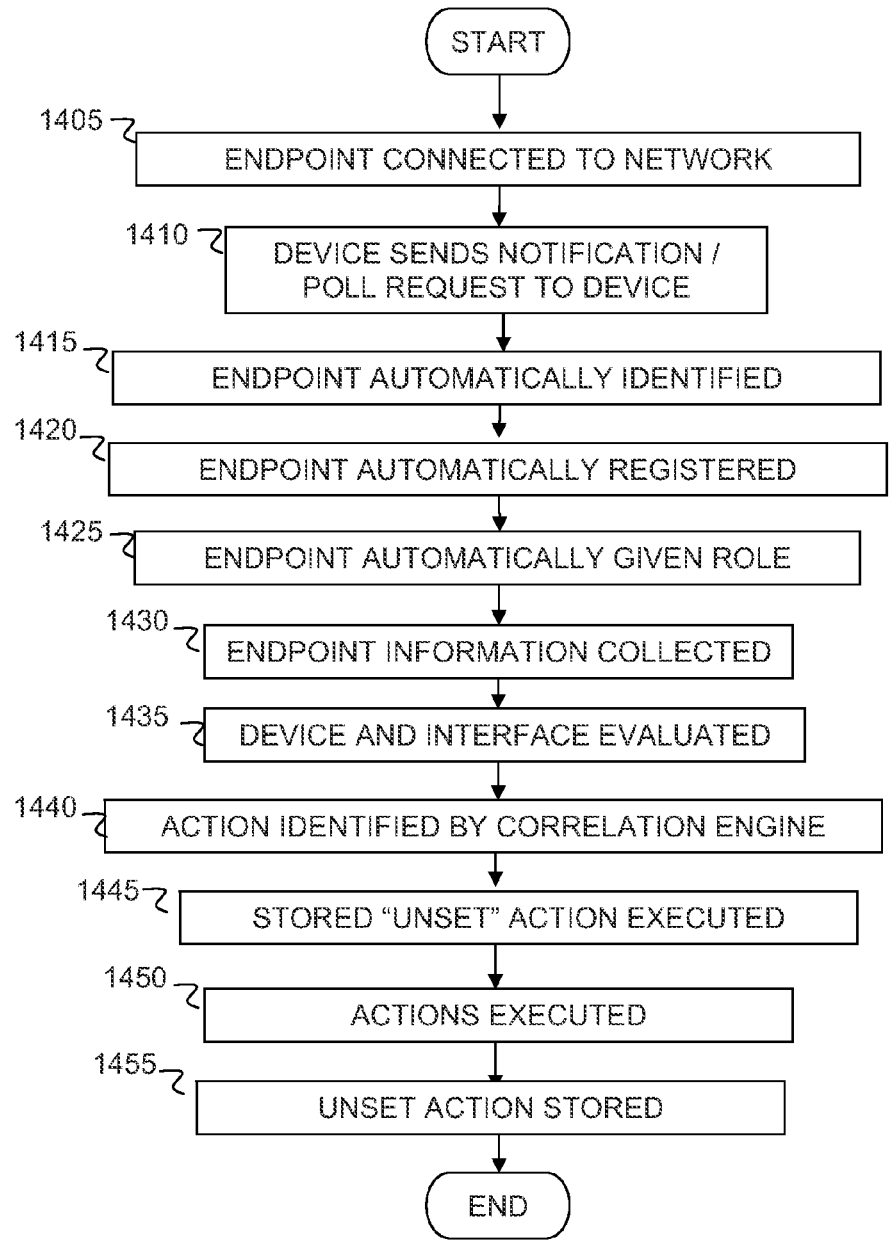
FIG. 14 is a simplified flow chart of a fourth process flow configured in accordance with one embodiment of the present invention.

FIG. 14 depicts an auto ID example four process flow embodiment of the invention 1400. An endpoint connects to a network using a wired connection 1405. It is assumed for this example that the administrator has already performed the necessary initialization and configuration of both the NIDs and of the invention as shown in FIG. 3. The NID sends a notification of the new connection to the invention 1410. This notification can take the form of an SNMP trap, a Syslog message, a RADIUS request or some other, vendor proprietary, means. The invention can also learn of a newly connected endpoint as the result of a poll request it makes to the NID 1410. In embodiments, the endpoint is not registered, but is automatically identified 1415 by the invention based upon its DHCP fingerprint, NMAP analysis, pOf signature, and other means. POf is a tool by Michal Zalevski implementing passive operating system fingerprinting. In embodiments, the endpoint is automatically registered 1420 and assigned a Role 1425 based upon the device profile configuration defined by the system administrator. The endpoint status along with its connection state, role, connection location, and the current time are collected 1430. The endpoint location (device and interface) are evaluated 1435 to determine if they allow actions to be performed on endpoints connected to them. The endpoint characteristics are used by the Correlation Engine to identify an Action 1440 to perform on either the device in the network to which the endpoint is connected, or a designated surrogate device. If Actions are allowed on the affected device and port, and an "Unset" Action has been stored for the device or interface, it is executed 1445. The Action is executed for the device 1450. If an Unset action sequence is configured for the current Action, the current system parameters used by the Action sequence are stored in the database to be executed when the next endpoint action event occurs 1455.

FIG. 15 is a flowchart depicting the process 1500 used by the correlation engine to determine the actions to apply to NIDs when trigger events occur. Step 1505 comprises gathering from database: endpoint status, identity of user logged onto endpoint or identity of endpoint owner, point of access, NID or Interface, Role, and connection time. A decision is made whether the NID is configured for interface-based or client-based Actions 1510. For client-based, use individual endpoint status 1515. For interface-based, compute the most secure status representing all endpoints connected to the interface 1520. Next, does the Status or Role have an Action defined 1525? If no, does the NID have a previous Action applied 1530? If the NID does have a previous Action applied, execute Undo Action using saved parameters 1535. If the NID does not have a previous Action applied, exit 1540. From 1525, if the Status or Role does have an Action defined, does the NID where the endpoint is connected already have the same action applied 1545? If no, does the NID have the previous Action applied 1555? If yes, execute Undo Action using saved parameters 1560. If the NID does not have the previous Action applied (1555), execute set Action and preserve in the database the parameters for Undo Action 1565.

FIG. 16 is a flowchart of the selection of an action 1600 based on an endpoint status, a NID, an interface and a role assigned to an endpoint. Step 1605 comprises evaluating status, NID, interface, and Role 1605. Next, is the Status acceptable for production network access 1610? If yes, is the Action defined for the Role 1615? If yes, are the Actions enabled for the device/interface 1620? If yes, return the Action 1625. If the Status is not acceptable for production network access (1610), is the Action defined for the Status 1630? If not, return with no Action 1635. If the Action is defined for the Status (1630), go to 1620, are Actions enabled for the device/interface?

Figure 17:
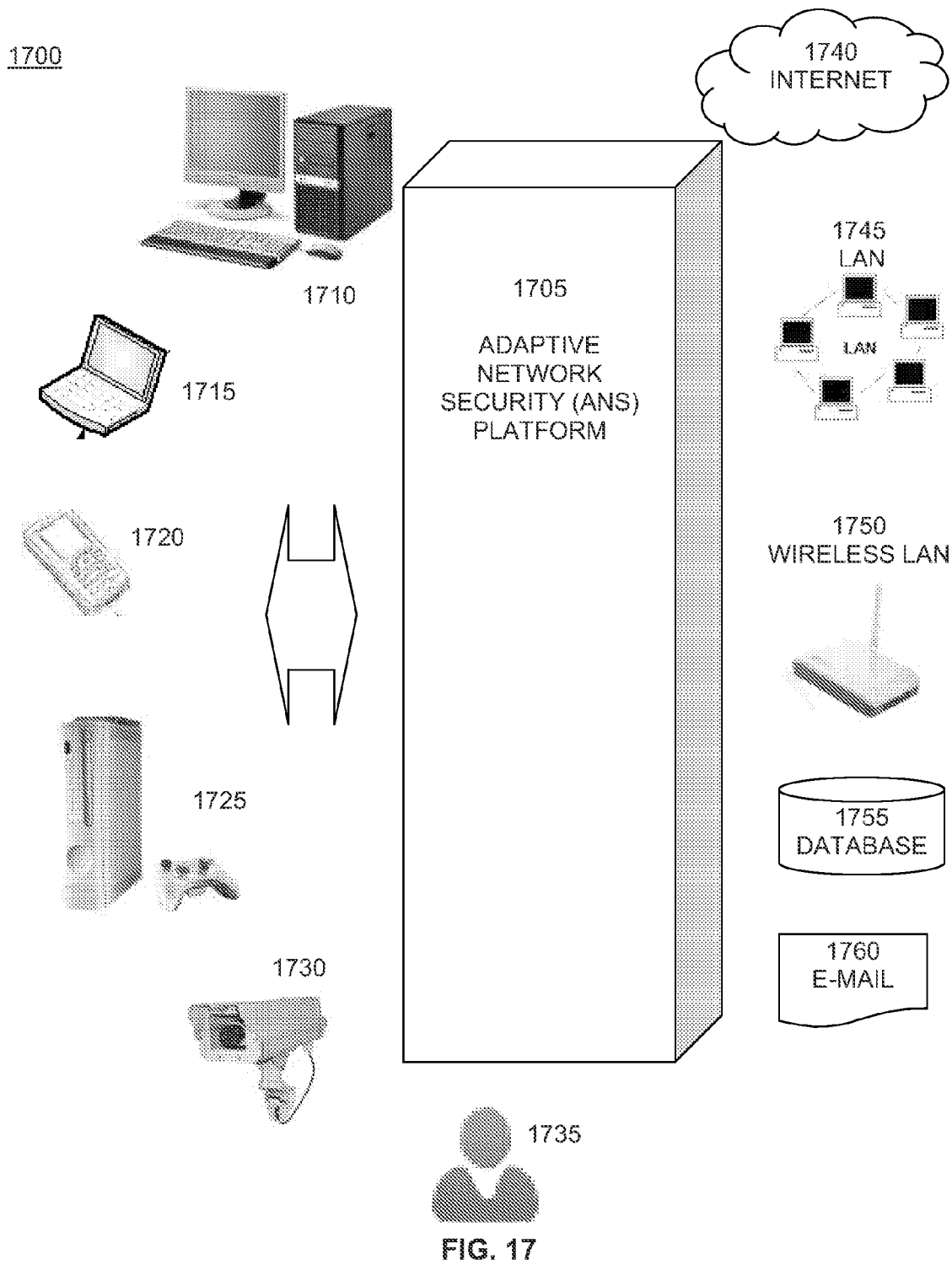
FIG. 17 is a diagram of component configurations in accordance with one embodiment of the present invention.

FIG. 17 is a diagram of component configurations 1700. Adaptive network security platform 1705 provides dynamic device configuration enabling network and security administrators to define policies that indicate event and alert conditions within their networks. Nonlimiting endpoint components comprise devices such as hospital and HVAC systems (not shown); PCs 1710; laptops 1715; IP phones and handheld devices 1720; game consoles 1725; and security cameras 1730. Among users 1735 are staff and guests. Nonlimiting examples of network infrastructure and IT resources comprise the internet 1740; LANs 1745; wireless LANs 1750; databases 1755; and e-mail 1760. Interaction between components can be by wired means such as coaxial cable, twisted pair, four twisted pair Ethernet LAN cable, fiber optic cable. Connection can be by wireless means such as RF, microwave, and infrared transmission. Devices incorporate transmitting and receiving components for their respective interaction means. Nonlimiting examples of information and database memory storage include removable storage such as flash memory, magnetic and optical disks and non-removable devices such as hard drives, RAM and ROM. Processing component examples include individual CPUs, multiple CPUs, and distributed processors. Components can include multiple elements of each. Logical network concepts are included. Examples of infrastructure devices include switches, routers, concentrators, wireless controllers and access points, and other specialized appliances of various types (i.e. IDS/IPS, Firewalls, Authentication servers, etc.).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for automated configuration of devices within a network by policy enforcement comprising:
A server having:
  a configuration module located at said server for initialization and configuration of a network;
  a discovery module located at said server for discovery initialization of network infrastructure devices (NIDs) on said network;
  an action module located at said server for action management of NIDs on said network;
  a role module located at said server for role management characterizing said NIDs, interfaces, users, and endpoints on said network;
  a profiling module located at said server for device profiling, identifying types of said endpoints connected to said NIDs on said network;
  an external policy module located at said server for external policy notification whereby systems external to said network are configured to inform said system with events and alerts;
  a compliance module located at said server for compliance of endpoints on said network by agent security policy; and
  a correlation engine module located at said server for determining actions to apply to said NI Ds when trigger events occur, wherein said correlation comprises:
    gathering connection time, endpoint status, identity of user logged into said endpoint, identity of endpoint owner and point of access NID or port role;
    if said NID is configured for interface-based actions, most secure status representing all endpoints connected to said interface is computed, and if status or role has action defined, and endpoint NID has same action applied, no action is taken;
    if said NID is configured for said interface-based actions, said most secure status representing all said endpoints connected to said interface is computed, and if said status or role has action defined, and said endpoint NID does not have same action applied, and if said endpoint NID does not have previous action applied, set action is executed and undo action parameters are saved;
    if said NID is configured for said interface-based actions, said most secure status representing all said endpoints connected to said interface is computed, and if said status or role has action defined, and said endpoint NID does not have same action applied, and if said endpoint NID does have previous action applied, undo action is executed using saved parameters, and set action is executed and undo action parameters are saved;
    if said NID is configured for said interface-based actions, said most secure status representing all endpoints connected to said interface is computed, and if neither said status nor role has action defined, and said endpoint NID does not have previous action applied, no action is taken;
    if said NID is configured for said interface-based actions, said most secure status representing all said endpoints connected to said interface is computed, and if neither said status nor role has action defined, and said endpoint NID does have previous action applied, undo action is executed using saved parameters;
    if said NID is configured for client-based actions, use individual endpoint status and if status or role has action defined, and endpoint NID has same action applied, no action is taken;
    if said NID is configured for said client-based actions, said individual endpoint status is used and if said status or role has action defined, and said endpoint NID does not have same action applied, and if said endpoint NID does
  not have previous action applied, set action is executed and undo action parameters are saved;
    if said NID is configured for said client-based actions, said individual endpoint status is used and if said status or role has action defined, and said endpoint NID does not have same action applied, and if said endpoint NID does have previous action applied, undo action is executed using saved parameters, and set action is executed and undo action parameters are saved;
    if said NID is configured for said client-based actions, use said individual endpoint status and if neither said status nor said role has action defined, and said endpoint NID does not have previous action applied, no action is taken; and
    if said NID is configured for said client-based actions, use said individual endpoint status and if neither said status nor said role has action defined, and said endpoint NID does have previous action applied, undo action is executed using saved parameters;
whereby said system controls connections between said endpoint devices and users with network infrastructure and information technology (IT) resources of said network.

2. The system of claim 1, wherein said configuration comprises:
  discovering network infrastructure devices (NID) by administrator;
  defining actions to perform on said discovered NIDs;
  defining roles to assign to endpoints connected to said discovered NIDs;
  defining endpoint profiles;
  configuring external security systems to provide notification when events/alerts occur; and
  defining endpoint security policies,
  wherein, when completely configured, defined actions are automatically performed for defined conditions.

3. The system of claim 1, wherein said discovery comprises:
  identifying types of discovered NIDs;
  creating model representations for said discovered NIDs;
  querying said discovered NIDs to learn of interfaces each said discovered NID supports;

creating model representations for said interfaces; and
creating groups.
4. The system of claim 1, wherein said action management comprises:
creating actions for NID model types; and
assigning actions to specific NID model instances for status transition states and roles.
5. The system of claim 1, wherein said role management comprises:
creating roles characterizing users and endpoints; and
associating said roles with actions for a group of NID or interface models.
6. The system of claim 1, wherein said device profiling comprises:
creating device profiling rules;
connection of an endpoint to at least one said NID;
collecting endpoint profile data from said at least one NID;
identifying endpoint type from said profiles;
creating models for said endpoints;
setting status of said model; and
assigning a role for said model.
7. The system of claim 1, wherein said external policy notification comprises:
configuring external systems to generate events and alerts directed to said system;
identifying endpoint associated with said event or alert;
setting status of said endpoint according to rules created by administrator.
8. The system of claim 1, wherein said endpoint compliance by agent security policy comprises:
defining security policies identifying required and prohibited software;
attempting to communicate with an agent on said endpoint;
downloading an agent if none present;
running said agent;
obtaining information about said endpoint;
selecting appropriate security policy;
sending said appropriate security policy to said agent;
executing said appropriate security policy by said agent on said endpoint;
responding with results of execution of said appropriate security policy;
determining status of said endpoint from said results; and
setting status of endpoint model for said endpoint.
9. A method for automated configuration of devices within a network by policy enforcement comprising the steps of:
configuring at a server, initialization of said network;
initializing at said server, discovery of network infrastructure devices (NIDs) on said network;
managing at said server, action of said NIDs on said network;
managing at said server, roles characterizing said devices, users, and endpoints on said network;
profiling at said server, said devices, identifying types of said endpoints connected to said NIDs on said network;
external policy notification from said server, whereby systems external to said network are configured with policy notification from events and alerts; compliance of said endpoints by said server, on said network by agent security policy; and
correlating at said server, whereby actions to apply to said NIDs when trigger events occur are determined, said correlating comprises:
gathering connection time, endpoint status, identity of user logged into said endpoint, identity of endpoint owner and point of access NID or port role;

if said NID is configured for interface-based actions, most secure status representing all endpoints connected to said interface is computed, and if status or role has action defined, and endpoint NID has same action applied, no action is taken;
if said NID is configured for said interface-based actions, said most secure status representing all said endpoints connected to said interface is computed, and if said status or role has action defined, and said endpoint NID does not have same action applied, and if said endpoint NID does not have previous action applied, set action is executed and undo action parameters are saved;
if said NID is configured for said interface-based actions, said most secure status representing all said endpoints connected to said interface is computed, and if said status or role has action defined, and said endpoint NID does not have same action applied, and if said endpoint NID does have previous action applied, undo action is executed using saved parameters, and set action is executed and undo action parameters are saved;
if said NID is configured for said interface-based actions, said most secure status representing all endpoints connected to said interface is computed, and
if neither said status nor role has action defined, and said endpoint NID does not have previous action applied, no action is taken;
if said NID is configured for said interface-based actions, said most secure status representing all said endpoints connected to said interface is computed, and if neither said status nor role has action defined, and said endpoint NID does have previous action applied, undo action is executed using saved parameters;
if said NID is configured for client-based actions, use individual endpoint status and if status or role has action defined, and endpoint NID has same action applied, no action is taken;
if said NID is configured for said client-based actions, said individual endpoint status is used and if said status or role has action defined, and said endpoint NID does not have same action applied, and if said endpoint NID does not have previous action applied, set action is executed and undo action parameters are saved;
if said NID is configured for said client-based actions, said individual endpoint status is used and if said status or role has action defined, and said endpoint NID does not have same action applied, and if said endpoint NID does have previous action applied, undo action is executed using saved parameters, and set action is executed and undo action parameters are saved;
if said NID is configured for said client-based actions, use said individual endpoint status and if neither said status nor said role has action defined, and said endpoint NID does not have previous action applied, no action is taken; and
if said NID is configured for said client-based actions, use said individual endpoint status and if neither said status nor said role has action defined, and said endpoint NID does have previous action applied, undo action is executed using saved parameters;
whereby endpoint devices and users are connected with network infrastructure and information technology (IT) resources of said network.
10. The method of claim 9, wherein said initialization configuration comprises:
discovering said network infrastructure devices (NIDs) by administrator;
defining actions to perform on said discovered NIDs;

defining roles to assign to endpoints connect to said discovered NIDs;
defining endpoint profiles;
configuring external security systems to provide notification when events/alerts occur; and
defining endpoint security policies,
wherein, when completely configured, defined actions are automatically performed for defined conditions.

11. The method of claim 9, wherein said discovery initialization comprises:
identifying types of said discovered NIDs;
creating model representations for said discovered NIDs;
querying said discovered NIDs to learn of interfaces each said discovered NID supports;
creating model representations for said interfaces; and
creating groups.

12. The method of claim 9, wherein said action management comprises:
creating actions for NID model types; and
assigning actions to specific NID model instances for status transition states and roles.

13. The method of claim 9, wherein said role management comprises:
creating roles characterizing users and endpoints; and
associating said roles with actions for a group of NID or interface models.

14. The method of claim 9, wherein said device profiling comprises:
creating device profiling rules;
connection of an endpoint to at least one said NID;
collecting endpoint profile data from said at least one NID;
identifying endpoint type from said profiles;
creating models for said endpoints;
setting status of said model; and
assigning a role for said model.

15. The method of claim 9, wherein said external policy notification comprises:
configuring external systems to generate events and alerts directed to said system;
identifying endpoint associated with said event or alert;
setting status of said endpoint according to rules created by administrator.

16. The method of claim 9, wherein said compliance of endpoints by agent security policy comprises:
defining security policies identifying required and prohibited software;
attempting to communicate with an agent on said endpoint;
downloading an agent if none present;
running said agent;
obtaining information about said endpoint;
selecting appropriate security policy;
sending said appropriate security policy to said agent;
executing said appropriate security policy by said agent on said endpoint;
responding with results of execution of said appropriate security policy;
determining status of said endpoint from said results; and
setting status of endpoint model for said endpoint.

17. The method of claim 9, wherein said endpoint devices comprise PCs, laptops, handheld devices, IP phones, game consoles, security cameras, HVAC systems, and hospital systems; and
said network infrastructure and IT resources comprise wireless LAN, wired LAN, WAN, VPN, internet, e-mail, databases, and DHCP/DNS.

18. An apparatus for automated computer network device configuration by policy enforcement comprising:
a microprocessor operating on instructions of a configuration module for initialization configuration of said computer network;
a discovery module for discovery initialization of network infrastructure devices (NIDs) on said computer network through at least one physical communication connection;
an action module executed by a microprocessor for action management of access devices on said computer network;
a role module for role management characterizing devices, users, and endpoints on said computer network;
a profiling module for device profiling identifying types of said endpoints connected to said NIDs on said computer network through at least one physical communication connection;
an external policy module for external policy notification whereby computer system components located external to said devices of said computer network are configured with policy notification from events and alerts;
a compliance module for compliance of said endpoints on said computer network by agent security policy; and
a correlation engine module for determining actions to apply to said NIDs when trigger events occur, wherein said correlation comprises:
gathering connection time, endpoint status, identity of user logged into said endpoint, identity of endpoint owner and point of access NID or port role;
if said NID is configured for interface-based actions, most secure status representing all endpoints connected to said interface is computed, and if status or role has action defined, and endpoint NID has same action applied, no action is taken;
if said NID is configured for said interface-based actions, said most secure status representing all said endpoints connected to said interface is computed, and if said status or role has action defined, and said endpoint NID does not have same action applied, and if said endpoint NID does not have previous action applied, set action is executed and undo action parameters are saved;
if said NID is configured for said interface-based actions, said most secure status representing all said endpoints connected to said interface is computed, and if said status or role has action defined, and said endpoint NID does not have same action applied, and if said endpoint NID does have previous action applied, undo action is executed using saved parameters, and set action is executed and undo action parameters are saved;
if said NID is configured for said interface-based actions, said most secure status representing all endpoints connected to said interface is computed, and
if neither said status nor role has action defined, and said endpoint NID does not have previous action applied, no action is taken;
if said NID is configured for said interface-based actions, said most secure status representing all said endpoints connected to said interface is computed, and if neither said status nor role has action defined, and said endpoint NID does have previous action applied, undo action is executed using saved parameters;
if said NID is configured for client-based actions, use individual endpoint status and if status or role has action defined, and endpoint NID has same action applied, no action is taken;

if said NID is configured for said client-based actions, said individual endpoint status is used and if said status or role has action defined, and said endpoint NID does not have same action applied, and if said endpoint NID does not have previous action applied, set action is executed and undo action parameters are saved;

if said NID is configured for said client-based actions, said individual endpoint status is used and if said status or role has action defined, and said endpoint NID does not have same action applied, and if said endpoint NID does have previous action applied, undo action is executed using saved parameters, and set action is executed and undo action parameters are saved;

if said NID is configured for said client-based actions, use said individual endpoint status and if neither said status nor said role has action defined, and said endpoint NID does not have previous action applied, no action is taken; and if said NID is configured for said client-based actions, use said individual endpoint status and if neither said status nor said role has action defined, and said endpoint NID does have previous action applied, undo action is executed using saved parameters;

whereby said apparatus controls connectivity of said endpoint devices and users with said computer network infrastructure devices and information technology (IT) resources of said computer network.

\* \* \* \* \*